United States Patent [19]

Delbe et al.

[11] Patent Number: 5,219,432
[45] Date of Patent: Jun. 15, 1993

[54] DEVICE FOR UNSTACKING FLAT OBJECTS

[75] Inventors: Emmanuel Delbe, Granges les Valence; Francois Gillet, Parmain; Etienne Serot; Raymond Chifflet, both of Granges les Valence; Roland Allio, La Roche de Glun; Philippe Jeantin, Valence; Gilbert Del Fabro, La Roche de Glun; Guy Forella, Saint Peray, all of France

[73] Assignee: Compagnie Generale d'Automatisme CGA HGS, Paris, France

[21] Appl. No.: 630,808

[22] Filed: Dec. 21, 1990

Related U.S. Application Data

[63] Continuation of Ser. No. 434,551, Nov. 13, 1989, abandoned, which is a continuation of Ser. No. 208,537, Jun. 20, 1988, abandoned.

[30] Foreign Application Priority Data

Jun. 18, 1987 [FR] France .................... 87 08519

[51] Int. Cl.⁵ ............................................... B65G 59/04
[52] U.S. Cl. ........................................... 271/103; 271/31.1; 271/106; 271/150; 414/752; 414/798.9; 414/786
[58] Field of Search ................ 271/31.1, 96, 103, 106, 271/267, 268, 150; 414/752, 796.9, 797, 797.1, 798.9, 786

[56] References Cited

U.S. PATENT DOCUMENTS

| | | | |
|---|---|---|---|
| 3,039,767 | 6/1962 | Staines | 271/103 |
| 3,193,281 | 7/1965 | Silsby, III et al. | 271/11 |
| 3,724,687 | 4/1973 | Marschke et al. | |
| 3,885,784 | 5/1975 | Sautton | 271/31.1 X |
| 4,002,332 | 1/1977 | Hoenigmann | 414/121 X |
| 4,513,957 | 4/1985 | Schaefer, Jr. | 271/31.1 X |
| 4,564,188 | 1/1986 | McNair | 414/330 X |
| 4,569,512 | 2/1986 | Bergerioux et al. | 271/103 |
| 4,589,648 | 5/1986 | Hancock | 414/797 X |
| 4,648,786 | 3/1987 | Sakurai | 414/752 |
| 4,669,716 | 6/1987 | Vander Syde et al. | 271/106 X |
| 4,701,094 | 10/1987 | Courjaret et al. | 414/330 |
| 4,720,227 | 1/1988 | Eberle | 414/797 X |
| 4,757,985 | 7/1988 | Hamant et al. | 271/31.1 |
| 4,759,679 | 7/1988 | Müller | 414/121 |
| 4,936,566 | 6/1990 | Hiramatsu | 414/797 X |
| 4,958,824 | 9/1990 | Willits et al. | 271/103 X |

FOREIGN PATENT DOCUMENTS

| | | |
|---|---|---|
| 0212865 | 3/1987 | European Pat. Off. |
| 1112538 | 3/1962 | Fed. Rep. of Germany |
| 3326552 | 2/1985 | Fed. Rep. of Germany |
| 57-67426 | 4/1982 | Japan ........................ 414/121 |
| 2125367 | 3/1984 | United Kingdom |

Primary Examiner—Michael S. Huppert
Assistant Examiner—Janice Krizek
Attorney, Agent, or Firm—Sughrue, Mion, Zinn, Macpeak & Seas

[57] ABSTRACT

A device for unstacking flat objects comprises an unstacking head (2) provided with a suction cup (88) for grasping the first flat object in a stack of such objects presented thereto and for moving a grasped flat object towards an exit position (40) in which the object is released. The suction cup (88) is a bellows suction cup made of a flexible material such that when it grasps the first flat object in the stack, it retracts under the effect of the suction and entrains at least the surface of the grasped object therewith as it retracts. A shoe (90) having a surface close to the grasping plane of the suction cup is disposed adjacent to the suction cup in fixed relationship relative to the mount (50) carrying the suction cup. The shoe thus constitutes an obstacle to the surface of a grasped flat object, thereby warping said surface as the suction cup retracts.

10 Claims, 6 Drawing Sheets

DEVICE FOR UNSTACKING FLAT OBJECTS

This is a continuation of application Ser. No. 07/434,551 filed Nov. 13, 1989 now abandoned, which is a continuation of application Ser. No. 07/208,537 filed Jun. 20, 1988 now abandoned.

The present invention relates to a device for unstacking flat objects, i.e. a device for taking flat objects one-by-one from a stack in order to present them one-by-one in an exit position to be taken up by a destination machine.

These flat objects may, in particular, be postage items and the unstacking device may be used for feeding an indexing and/or sorting machine.

BACKGROUND OF THE INVENTION

Conventionally, devices for unstacking flat objects essentially comprise a magazine for storing a stack of postage items and an unstacking head at the end of the magazine. The magazine includes drive means for presenting the first item in the stack in a well-defined position and standing on edge. The unstacking head may be constituted by a suction cup which performs a plunging movement to come into contact with the first item in the stack and to grasp it by suction, and which is moved in translation in order to take the item away from its stopped position to an exit position where it is taken up by the destination machine. During this time, the stack advances in the magazine and the next item takes the place of the preceding item.

British patent specification GB-A-2 125 367 illustrates this type of equipment. Although it includes a bellows, the suction cup is relatively rigid and only its lip adapts to the shape of the surface of the object to be grasped.

Suction cup systems are known in other fields where the problem of separating flat objects one-by-one does not occur in the same way (cf. the following patent documents: U.S. Pat. No. 3,724,687, DE-A-3 326 552, U.S. Pat. No. 3,193,281, EP-A-0 212 865, DE-C-1 112 538).

Postage items can be very varied in nature, and the surfaces they present to the unstacking head may be stiff or floppy, smooth or porous, and the item as a whole may be thin or thick, light or heavy. The unstacking head must be capable of grasping and moving thick and heavy items having stiff and smooth surfaces as well as open items; its suction force must therefore be sufficiently high. However, in a given batch of postage, there may also be light single sheets which are thin and porous and which have a natural tendency to adhere to one another so that the high suction force of the unstacking head tends, from time to time, to pick them up together and move them together to the exit position.

Unstacking, i.e. taking the items from the stack one-by-one thus remains a problem which is not fully solved.

The object of the present invention is thus to provide an improved unstacking head which is considerably better at separating thin objects, in particular, without degrading its performance when unstacking other objects.

SUMMARY OF THE INVENTION

The present invention thus provides a device for unstacking flat objects, the device comprising an unstacking head provided with only one suction cup in order to grasp the first flat object in a stack of such objects which are presented thereto, and to move it towards an exit position where the grasped flat object is released, wherein the suction cup is a bellows suction cup made of a flexible material such that, when it grasps a first flat object in the stack, it retracts under the effect of the suction and in its retraction motion it entrains therewith at least the surface of the grasped object.

The grasped object is jerked by the retraction of the suction cup, and it thus tends to be separated from another object to which it may be adherring.

The invention also provides means for accurately displacing the suction cup towards the first object in the stack, said means comprising a mount provided with plunging guide means and with drive means. The guide means are preferably two parallel slides and the drive means are preferably an electric motor with rack-and-pinion transmission.

The invention also provides means for moving the suction cup from its grasping position to an exit position where the grasped object is released, said means comprising a carriage. Preferably, said carriage is guided by two parallel slides and is driven by an electric motor, via a belt transmission.

In addition, the invention provides for a shoe which is fixed to the mount adjacent to the suction cup and which has a surface close to the suction cup grasping plane. The shoe thus constitutes an obstacle when the suction cup retracts, thereby warping the surface of the object to be grasped and making it easier to separate the first object from the stack.

Finally, the invention provides a method of controlling the movements of the head, in which the plunging movement of the suction cup is essentially constituted by a rapid advance over a determined distance (which may be interrupted on detecting the presence of an item), followed by a slow advance until the item has been grasped.

BRIEF DESCRIPTION OF THE DRAWINGS

An embodiment of the invention is described by way of example with reference to the accompanying drawings, in which.

MORE DETAILED DESCRIPTION

Figure 1:
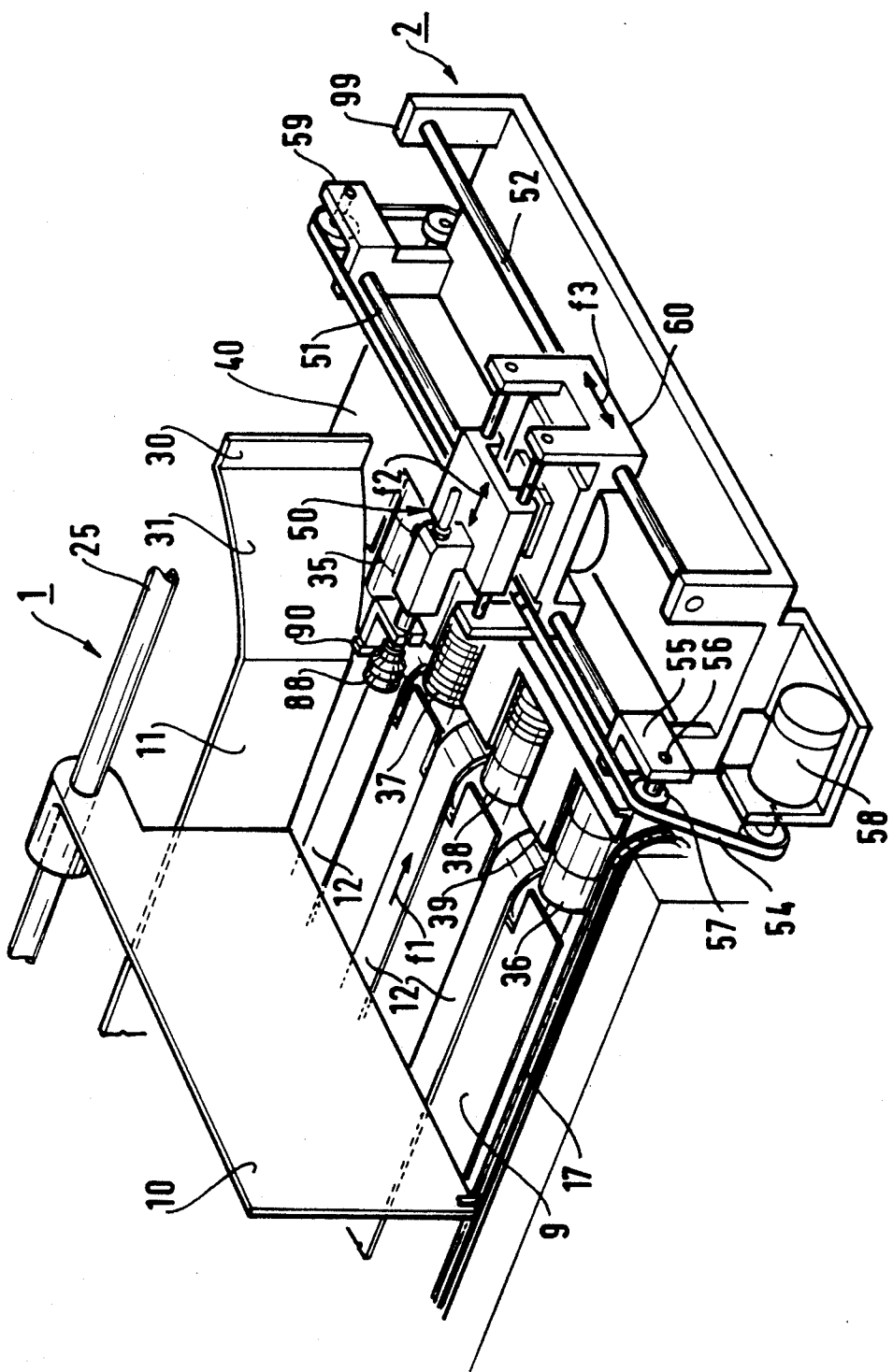
FIG. 1 is an overall view of an unstacking device in accordance with the present invention.
Figure 2:
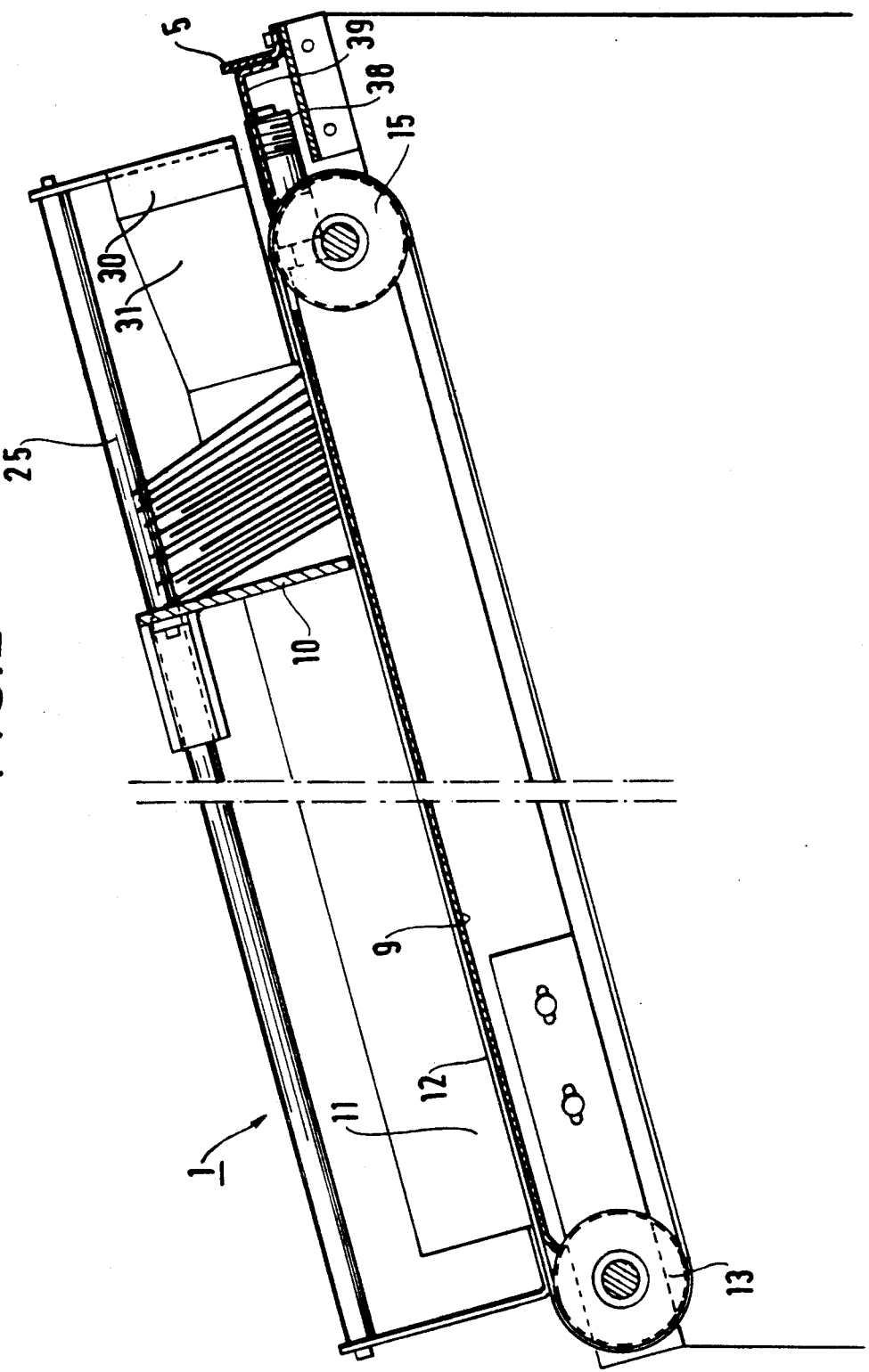
FIG. 2 is a side view in partial section of the conventional magazine of the FIG. 1 unstacking device.

The unstacking device shown in FIG. 1 comprises a magazine 1 and an unstacking head 2 mounted end on, i.e. in front of the magazine 1. The magazine 1 is conventional. It is shown in FIG. 2 in side view, with a side plate removed in order to show how postage items are presented to the unstacking head.

The magazine 1 is intended to be manually loaded with a stack of postage. Its top is open and the stack of postage is placed on a bottom 9 which slopes relative to the horizontal with a slope that rises from the back going towards the front. The stack of postage is placed in front of a backplate 10 against which it rests. An internal side piece 11 optionally retains the stack while it is being loaded. Postage drive means drive the stack as loaded towards the unstacking head 2. The drive means comprise an endless chain 17 and belts 12 passing over pulleys 13 and 15, one of which is a driving pulley. The backplate 10 slides along a side guide 25 by means of a non-referenced slider and includes a lug (not shown) which is engaged between the links of the chain 17. The stack of postage is thus driven in the direction of arrow f1 by the edges of the items standing on the belts 12 and by the backplate 10 supporting the back of the last item. When a new stack is loaded, the backplate is disengaged from the chain 17 and is moved backwards by hand.

The side piece 11 is extended by a jogging edge 31 and a terminal jogging surface 30 at the end of the magazine against which the items are urged by wheels 36, 38, 37, and 35 whose axes are parallel to the belts and whose surfaces are flush with the belts and which are rotated with a motion towards the jogging edges 30, 31 which is communicated by friction to the items in the stack as they move towards the unstacking head. Continuity of the bottom 9 is ensured between the wheels by a crenelated extension 39.

In addition, the surfaces of the wheels are helically formed, thereby preparing the items for unstacking by accelerating and then decelerating the bases of the items as they slide against the jogging edge.

A single electric motor with an appropriate transmission can be used for driving the belts, the chain, and the jogging wheels.

Finally, there is an abutment 5 on the extension 39. It stops the first item in the stack in a position suitable for the items to be grasped by the unstacking head. A detector, e.g. constituted by one or more photoelectric cells, serves in conventional manner to determine that an item has reached the abutment 5. The drive means are then stopped or declutched. When the item is removed, the drive means are put back into operation.

Figure 3:
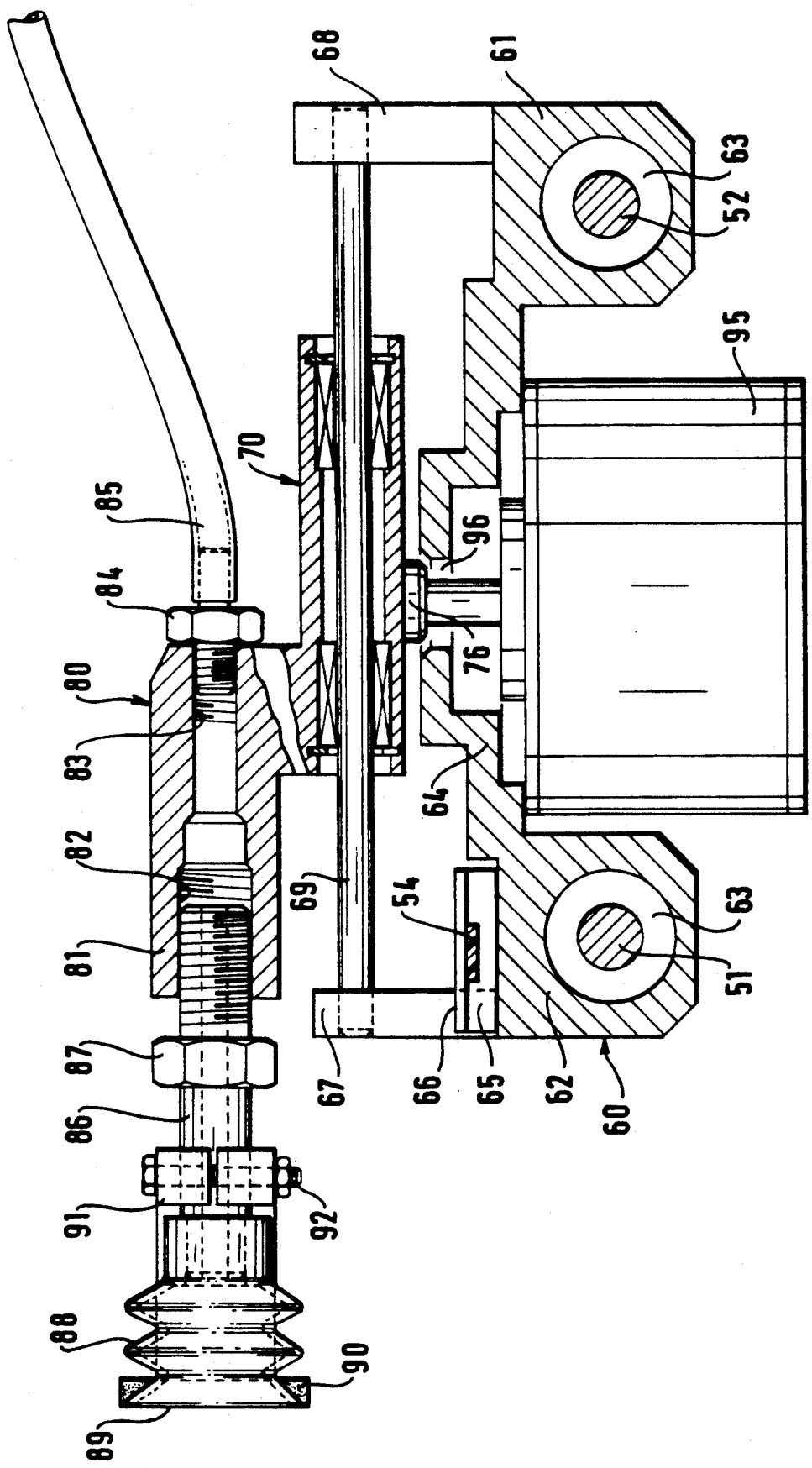
FIG. 3 is an elevation view in partial section of the FIG. 1 unstacking head.
Figure 4:
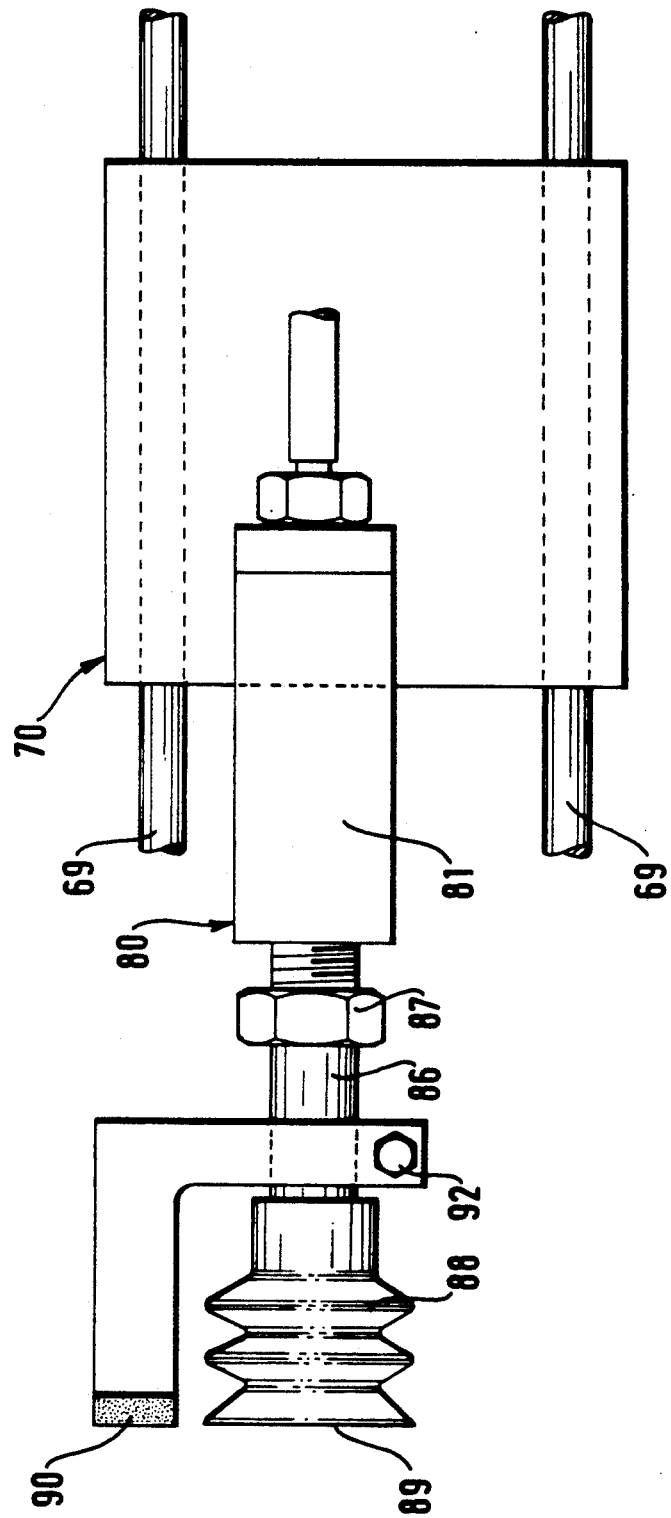
FIG. 4 is a fragmentary plan view of the mount carrying the suction cup and of the shoe in the FIG. 1 unstacking head.
Figure 5:
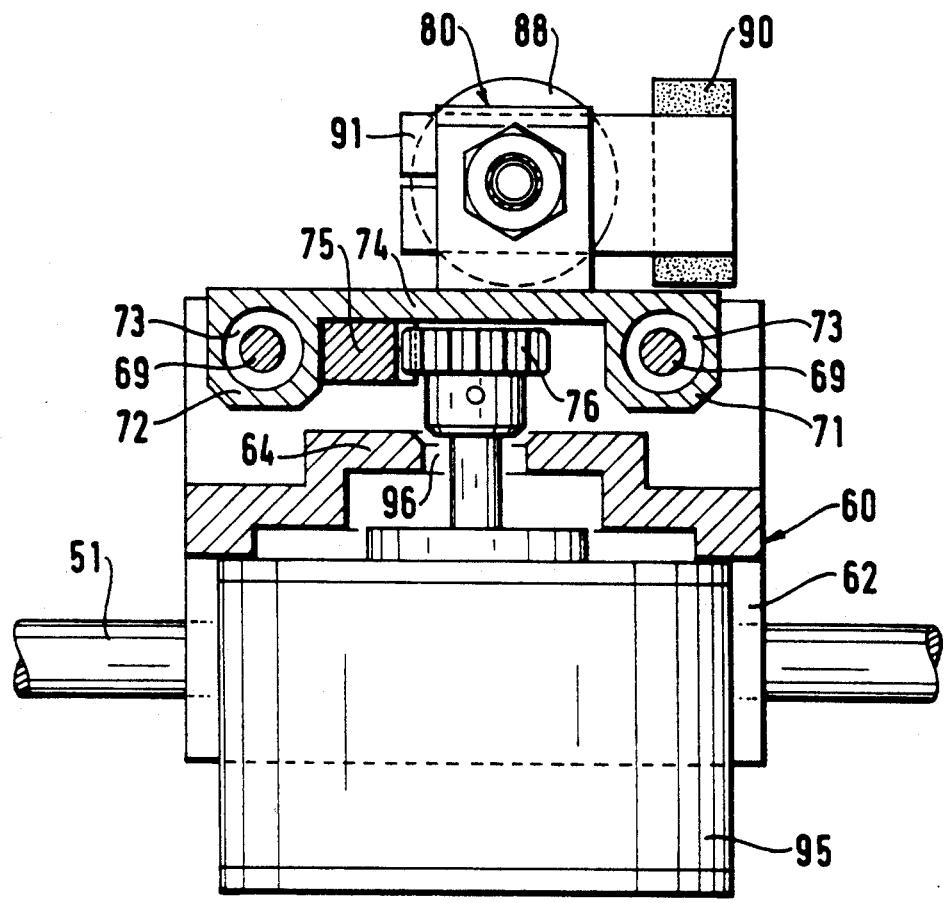
FIG. 5 is a cross-section view on the axis of the carriage showing the mount and its drive means.

The unstacking head referenced 2 in FIG. 1 is shown in greater detail in the elevation, plan, and end views of FIGS. 3, 4, and 5. It is essentially constituted by a mount 50 which is movable along arrow f2, and carried by a carriage 60 which is itself movable along arrow f3. The mount 50 carries a suction cup 88 and a shoe 90.

Displacement along arrow f2 serves to move the suction cup 88 and the shoe 90 towards the first item in the stack which is stopped in the magazine against the abutment 5 and whose presence is indicated by the detection means, as mentioned above. Movement continues until the surface of said item is taken up by the suction cup under the effect of the suction which is maintained therein. Displacement along arrow f3 then serves to move the item grasped by the suction cup 88 to the exit position 40 where it is released by the suction cup by turning off the suction, after which it is taken up by destination means (not shown) such as an indexing machine or a postal sorting machine.

The carriage 60 slides relative to two parallel slides 51 and 52 carried by pillars 99 fixed to the frame of the machine. To this end, it is driven by a notched belt 54 kept taut between wheels 57 carried on respective shafts 56 carried by tabs 55 and 59, said belt being driven by an electric motor 58.

More precisely, the carriage 60 comprises two parallel sliders 61 and 62 provided with bores 63 containing bearings through which the slides 51 and 52 pass. The sliders are interconnected by a bridge 64 for receiving and supporting the plunging motion drive motor 95 and provided with a central bore 96 for passing the shaft of said motor, which shaft is coupled to a drive pinion 76.

The carriage 60 is coupled to the notched belt 54 by two clamping pieces 65 and 66 which are pressed against each other and which are fixed to the slider 62. Each of the sliders 61 and 62 carries two pillars 67 and 68 on which the parallel slides 69 of the mount 70 are themselves mounted.

Although not shown, simple detection means may be fixed on the pillars 99 for detecting when the carriage 60 is to the left (as seen in FIG. 1) in a given starting position from which the unstacking head grasps the item provided by the magazine 1, or else to the right in a given exit position 40 which is where the unstacking head releases the items it has previously grasped.

The mount 70 slides on the slides 69 by means of two parallel sliders 71 and 72 provided with bores 73 containing bearings having respective ones of the slides 69 passing therethrough. The sliders are interconnected by a bridge 74 which carries the suction cup support 80. A rack 75 is fixed beneath the bridge 74 against slider 72. The drive pinion 76 meshes with the rack so that the motor 95 can drive the mount 70 from a starting position (to the right in FIG. 3) towards a grasping position (to the left in FIG. 3) under conditions which are explained below.

Also not shown, are sensors which may be fixed to the pillars 67 and 68 for detecting, in conventional manner, that the mount is either in its starting position or else in its position of maximum advance. The mount may also carry a proximity sensor for detecting the presence of an item in the stack at a certain distance in front of the suction cup.

The suction cup support 80 essentially comprises a support bracket 81 having an axial bore 82, 83 which is tapped at each end. The bore 83 is connected to a flexible suction pipe 85 via an end piece 84. It opens out into the bore 82 which serves to fix a suction cup mounting tube 86 via an end piece 87, optionally together with a gasket. The suction cup 88 is a part having one or more bellows (in this case it has two); it is made of flexible material such as rubber, and is capable of retracting when its orifice 89 is pressed against the closure surface, thereby pulling said surface towards the mount 70.

A pressure minimum detector, or "vacuostat", may be connected to the pipe 85 in order to indicate that the suction cup 88 has grasped an item, whenever the pressure in the pipe 85 falls below a given threshold.

Figure 6:
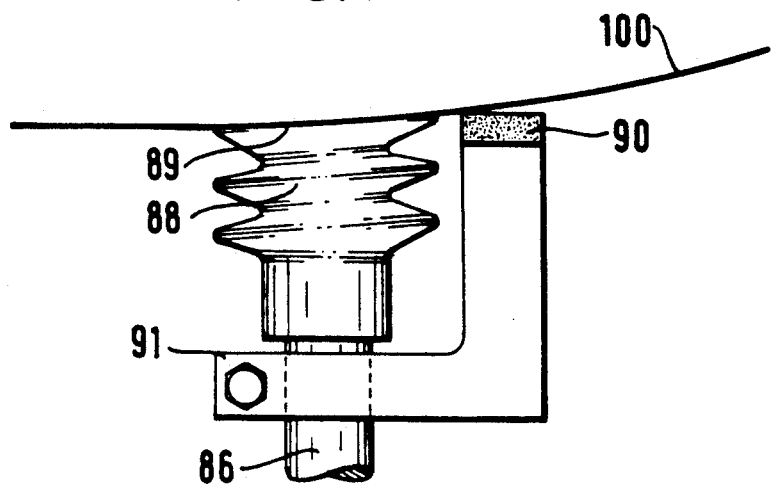
FIG. 6 is a plan view of the retracted suction cup showing the action of the shoe which causes the surface 100 of a grasped postage item to be warped by the suction cup.

The shoe 90 is fixed on the suction cup mounting tube by means of an angled arm 91 including a clamp which is tightened by a screw 92. The end of the shoe 90 lies in the same plane as the orifice 89 of the suction cup 88. When an item 100 is presented in front of the orifice 89, the suction cup snatches it and retracts, thereby warping the surface of the item in the direction of suction cup retraction as shown in outline in FIG. 6 since the item is pulled by the orifice 89 as it retracts relative to the shoe 90 while being simultaneously retained by the shoe 90 which prevents it from accompanying the orifice of the suction cup 88 as it moves. The next item in the stack which is not subjected to the same effects does not warp in the same manner. It therefore separates from the item which has just been grasped. The more suddenly the suction cup 88 snaps back, the greater the separation effect, since a sudden snatch takes advantage of the inertia of the second item resisting the motion which is imparted to the first item. It may be observed that the retraction movement of the suction cup is more sudden for lightweight items, thereby particularly improving the unstacking of thin objects which are generally the most difficult to separate from one another.

A sequence of operations for the unstacking head described above is now described with reference to the flow chart of FIG. 7.

This sequence of operations is preferably implemented by means of a microprocessor whose input signals are constituted by signals from the sensors whose existence is mentioned above. These sensors are accompanied by a sensor (not shown in the figures) for sensing displacement of the mount 50 and constituted, for example, by a conventional pulse strip. The pulses from this sensor are supplied to the microprocessor which permanently keeps track thereof in a memory register.

The input signals available to the microprocessor are summarized below:

DET = signal from a detector carried by the mount 50 and indicating the presence of an item to be unstacked at a determined distance in front of the suction cup;

E 1.4 = mount 50 in its starting position;

E 1.1 = carriage 60 in its starting position;

E 1.3 = a cycle control signal which may come from a button pressed by an operator for requesting the machine to extract an item from the stack, or which may be automatically supplied by the destination machine;

MW0 = pulse count relating to the pulse strip and continuously defining the position of the mount 50;

K5 = a first constant;

PLI = the vacuostat signal indicating the presence of a grasped item;

MW1 = a recorded intermediate value;

K2 = a second constant;

K6 = a third constant; and

E 1.2 = carriage 60 in its arrival position.

Figure 7:
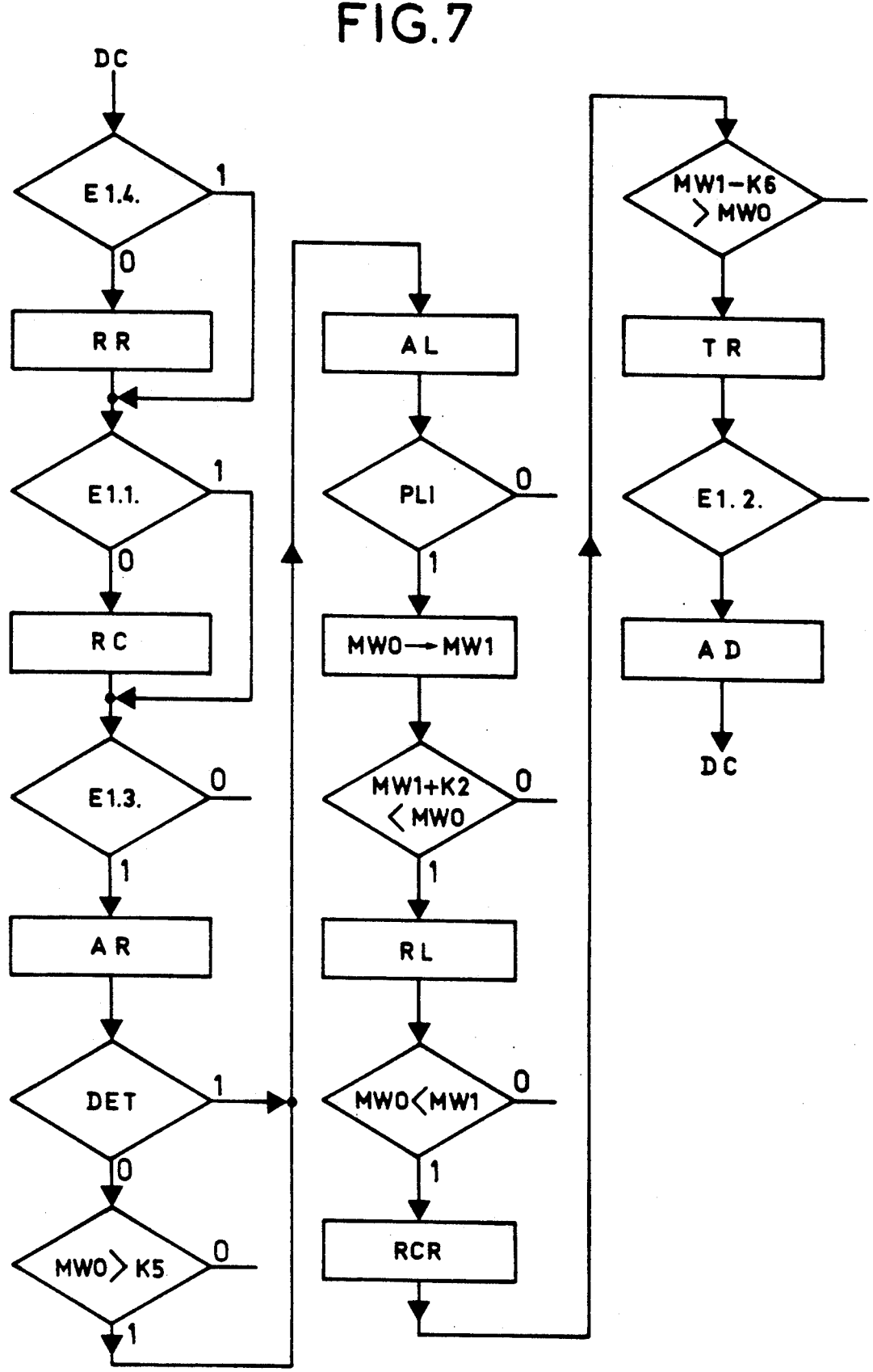
FIG. 7 is a flow chart showing an example of how the movements of the unstacking device of the preceding figures may be controlled.

In general, the processor returns periodically to the process illustrated by FIG. 7 at the point where it left it during a preceding period (a step marked by a rectangle) and it interrogates an input in order to determine whether it should move on to the next step.

When the machine is switched on, the processor always begins from a beginning of cycle situation DC. The processor then performs the following sequence of steps:

RR = so long as the signal E 1.4 is absent, the processor causes the mount 50 to reverse rapidly by applying an output control signal to the power supply circuit of the motor 95 instructing it to reverse the mount 50;

RC = if the signal E 1.4 is present, then the mount 50 has reached its starting position, or if the command RR has been given to return the mount 50 to said position, and so long as the signal E 1.1 is absent, the processor applies a command signal RC to the control circuit for the motor 58 in order to cause it to drive the carriage 60 by means of the belt 54 towards its starting position;

AR = when the signals E 1.4 and E 1.1 are both present, then both the mount and the carriage have reached their respective starting positions, and if the signal E 1.3 is absent, then nothing further occurs; however, if the signal E 1.3 is present, the microprocessor applies a command signal to the power supply circuit of the motor 95 instructing it to cause the mount 50 to advance rapidly, i.e. as fast as possible with the hardware being used, and another command signal causes suction to be applied to the suction cup 88, e.g. by opening a valve;

AL = when a detector carried by the mount 50 indicates that an item is present by supplying a signal DET, or when the mount 50 has advanced over a predetermined maximum distance, the count MW0 which indicates its position becomes equal to a constant K5 (which may be applied to inputs of the microprocessor or which may be entered into a register by the manufacturer), the microprocessor instructs the power supply circuits of the motor 95 to cause the mount 50 to advance slowly instead of quickly without losing excessive time and while maintaing suction;

MW0→MW1 = advance the mount 50 slowly and the suction cup 80 carried thereby ends up by grasping the first item from the stack, thereby giving rise to the signal PLI, after which the processor transfers the count value provided by the register MW0 into the register MW1 while the commands described in step AL continue to be applied, thereby making it possible to confirm that the item has been grasped while suction cup retraction takes place;

RL = when, after the preceding step, the mount 50 has further advanced through a distance corresponding to a count value K2, the microprocessor performs the operation MW1+K2<MW0, and when it obtains a positive response it applies a new command to the power supply circuit of the motor 95 causing the mount 50 to reverse slowly with the suction cup 88 carrying the grasped item, and with suction being maintained;

RCR = slow reverse continues until MW0 is again equal to MW1, after which the microprocessor replaces the slow reverse command by a fast reverse command which differs from the command RR solely in that suction is maintained;

TR = the purpose of rapid reverse is to bring the grasped item into a position which suits the destination machine by travelling over a distance determined by a constant K6, that is why when the count MW0 becomes less than MW1−K6, the microprocessor stops the motor 95 in the position it has reached and applies a command signal to the power supply circuit of the motor 58 to cause the carriage to move towards the exit position; and AD = when the carriage 60 arrives in the exit position, the signal E 1.2 is present and the microprocessor stops the carriage, and then turns off the suction so that the suction cup 88 releases the item it has grasped; after an appropriate time delay, the microprocessor returns to the cycle beginning DC.

Naturally, in the above summary of operations, when the microprocessor performs a step and provides the commands specified, all other commands are cancelled. Depending on the circuits used, this may require special commands for stopping operations which are taking place.

The unstacking device described above and for which a sequence of operations has been given includes only one suction cup 88. In some applications it can happen that jogging is not always good enough and that items escape from the suction cup 88 because they are too far from the jogging edge 30. A solution to this problem, which is an extension of the present invention, consists in providing a second carriage such as 60 together with a second suction cup. The second carriage and its suction cup may be controlled in the same way as the first carriage (but naturally with different starting and arrival positions), and the effect of said second carriage is to grasp such items and bring them to the first suction cup 88.

Naturally the above description is given purely by way of non-limiting example, and numerous variants may be imagined without thereby going beyond the scope of the invention.

We claim:

1. A device for grasping a first flat object in a stack comprised of flat objects and moving said first object to an exit position, said flat objects possessing characteristics ranging from stiff to floppy, smooth to porous, thin to thick and light to heavy, said device comprising:

at least one suction cup for grasping said flat object comprising a cylindrical bellows having opposite axial ends, said bellows having a longitudinal axis, said bellows being made of a flexible material, said bellows having an orifice at one of said axial ends, said orifice defining a grasping plane that is parallel to the first object in the stack, said orifice being retractable along the axis of the bellows in a direction that is perpendicular to the grasping plane, whereby upon the application of suction to said bellows, said orifice is closed by said first object of said stack and retracts along said longitudinal axis of said bellows to pull the first object away from the stack by snapping the first object away from the stack, the retraction motion of the orifice entraining the grasped object;

a suction cup support having one end and an opposite end, said one end of the suction cup support being connected to a suction pipe, said suction cup being mounted to the opposite end of the suction cup support;

a shoe disposed solely to one side of the suction cup, outside of the suction cup and at a distance from the suction cup, said shoe being fixed relative to the suction cup support, said shoe having a surface that is close to the grasping plane of the orifice whereby said shoe abuts against a grasped object when the object is retracted along the axis of the bellows, thereby causing convex warping of the object in the orifice retraction direction in order to separate the first object from the stack.

2. A device for unstacking flat objects according to claim 1, wherein the device includes plunging means for moving the suction cup axially towards the first flat object in the stack, and wherein said plunging means comprises a mount including a plunging guide means enabling said mount to move linearly relative to a carriage in a direction towards the first object in the stack, the suction cup being fixed to said mount via said suction cup support, and said plunging means further including mount drive means for moving the suction cup along the cup axis towards the first flat object of the stack.

3. A device for unstacking flat objects according to claim 2, wherein said mount drive means comprise an electric motor, a drive pinion driven by the motor, and a rack with which the pinion meshes, the rack being fixed to said mount while the motor and the pinion are fixed to the carriage.

4. A device for unstacking flat objects according to claim 2, wherein said plunging guide means comprise two slides fixed to the carriage and two sliders fixed to the mount and associated with respective ones of the slides.

5. A device for unstacking flat objects according to claim 2, wherein translation guide means are associated with said carriage enabling the carriage to move from a position in which the suction cup is capable of grasping the first flat object in the stack by virtue of said plunging means operating, to a position in which said suction cup is to release said object, together with translation drive means for driving the carriage to the position in which the grasped object is to be released.

6. A device for unstacking flat objects according to claim 5, wherein said translation guide means comprise two fixed slides and two sliders fixed to the carriage and associated with respective ones of the fixed slides.

7. A device for unstacking flat objects according to claim 5, wherein said translation drive means comprise an electric motor fitted with a pinion driving a belt, together with pulley wheels located on either side of the carriage and keeping the belt taut, with the carriage being coupled to the belt between the two pulley wheels.

8. A device for unstacking flat objects according to claim 1, wherein said at least one suction cup comprises identical first and second suction cups and said second suction cup is located at one side of said first suction cup, on the side opposite from said exit position, and at a distance from said first suction cup so as to grasp objects in the stack which are offset and escape the first suction cup, with the movement of said second suction cup being generally parallel to that of said first suction cup.

9. A method of controlling an unstacking device, said unstacking device comprising:

a suction cup for grasping a first flat object in a stack comprised of said objects, said flat objects possessing characteristics ranging from stiff to floppy, smooth to porous, thin to thick, light to heavy, said section cup comprising a cylindrical bellows made of flexible material, said bellows having opposite axial ends and a longitudinal axis, said bellows having an orifice at one of the axial ends, said orifice being perpendicular to the longitudinal axis of the bellows, said orifice defining a grasping plane which is parallel to the object in the stack, said orifice being retractable along the longitudinal axis of the bellows;

a shoe disposed outside of and solely to one side of said suction cup, said shoe having a surface close to the grasping plane of the orifice, whereby upon the application of suction to said bellows, said orifice is closed by an object of said stack and retracts along said longitudinal axis of said bellows, the retraction motion of the orifice entraining the grasped object;

a mount including a suction pipe and a suction cup support having a bore, said suction cup support having one end and an opposite end, said suction cup support being mounted at said one end to said suction pipe, said suction cup being mounted to said suction cup support at said opposite end;

a carriage supporting said mount for movement toward and away from the stack, said carriage being movable transversely of the stack, said method comprising the following steps:

placing said carriage and said mount into respective starting positions;

advancing the mount rapidly through a determined distance limited by detection of an object in front of the mount;

advancing the mount slowly;

grasping an object and snapping the object away from the stack in the orifice retraction direction and convex warping the object in the orifice retraction direction upon contact of the grasped object with said shoe surface;

detecting an increase in suction force caused by closure of the orifice by the grasped object;

translating the carriage transversely relative to the stack through a determined distance toward an exit position; and releasing the grasped object.

10. A control method according to claim 9, wherein after the grasping of the object, the following steps are performed:

the mount continues to advance slowly over a short determined distance after detecting that an object has been grasped; and the mount is reversed slowly over a determined distance.

* * * * *